E. N. GAUDRON.
MACHINE FOR MAKING BRUSHES.
APPLICATION FILED DEC. 11, 1911.
1,072,326.
Patented Sept. 2, 1913.
5 SHEETS—SHEET 1.
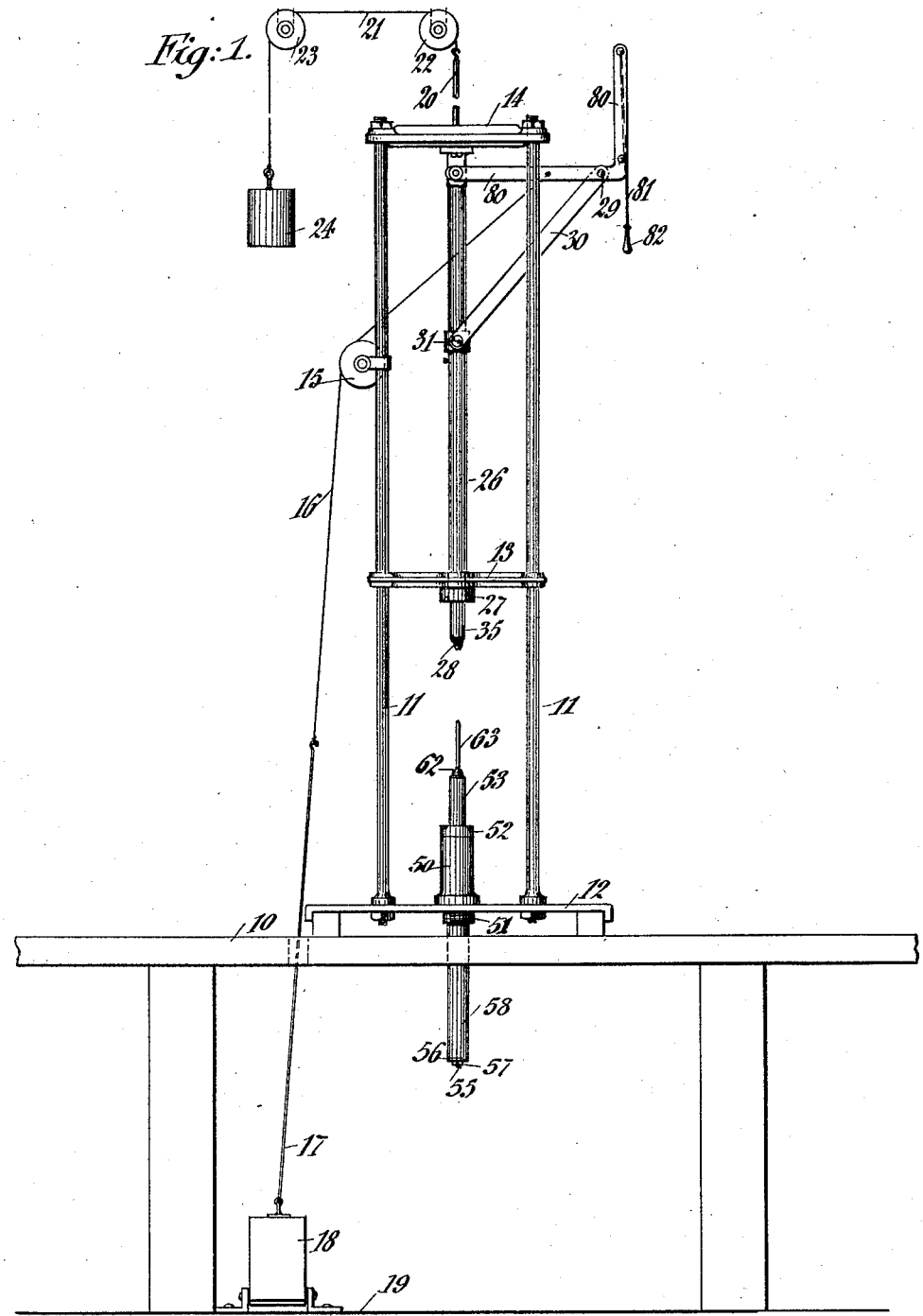
Witnesses:
John Murtagh
L. J. Murphy
Inventor
Edward N. Gaudron
By his Attorneys
Goepel & Goepel

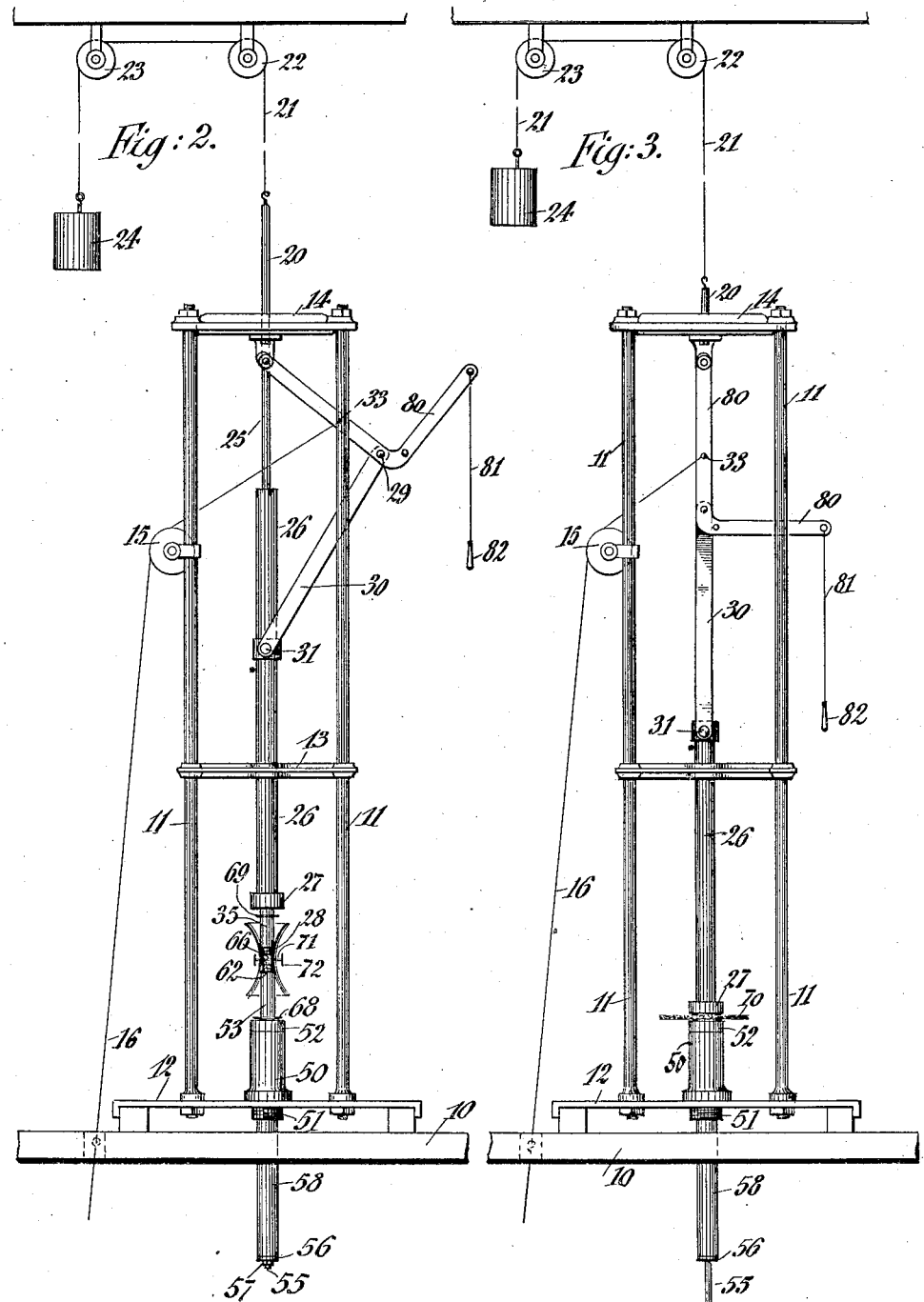

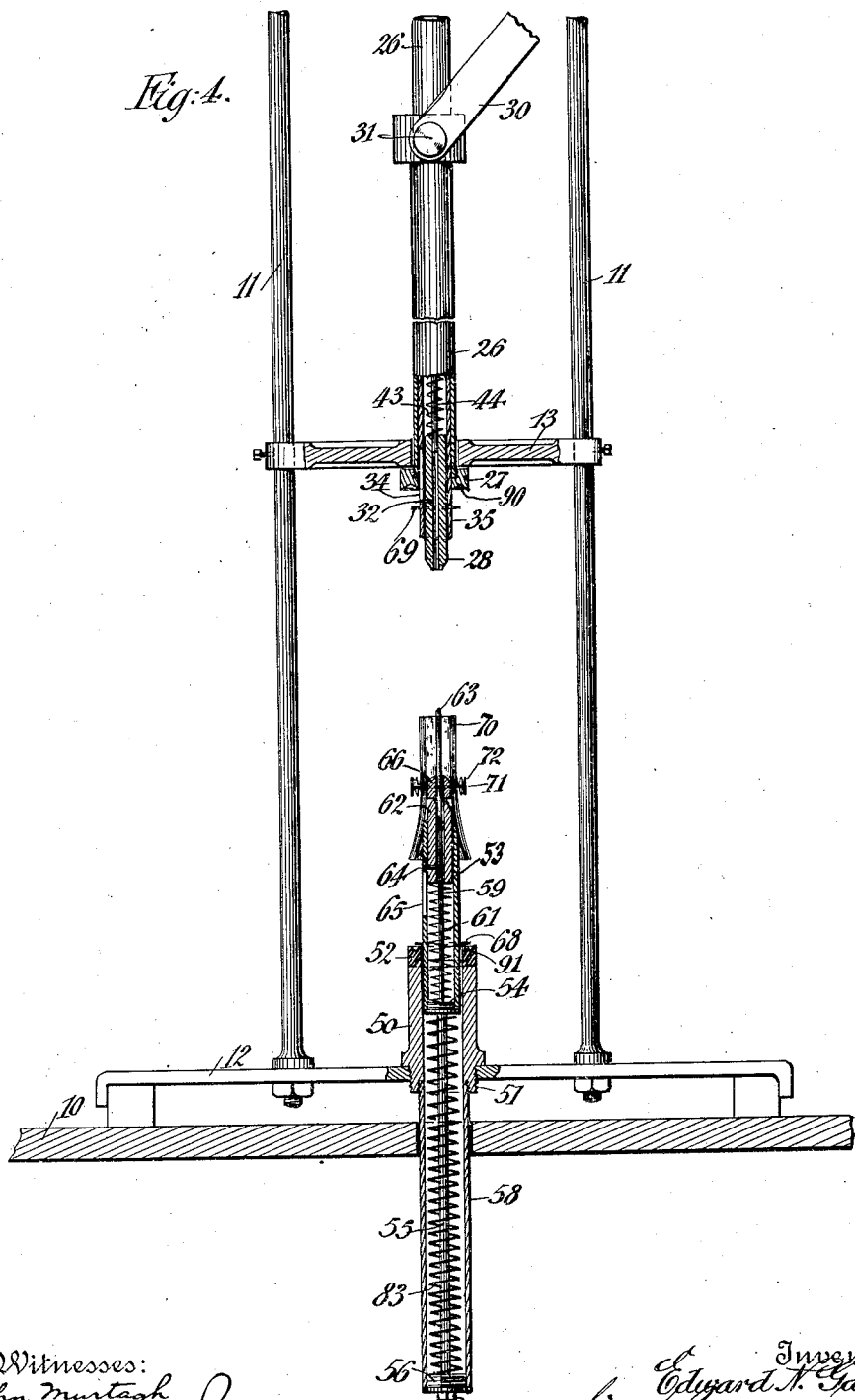

E. N. GAUDRON.
MACHINE FOR MAKING BRUSHES.
APPLICATION FILED DEC. 11, 1911.
1,072,326.
Patented Sept. 2, 1913.
5 SHEETS—SHEET 4.
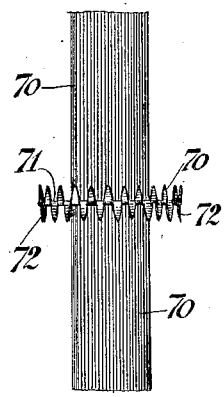
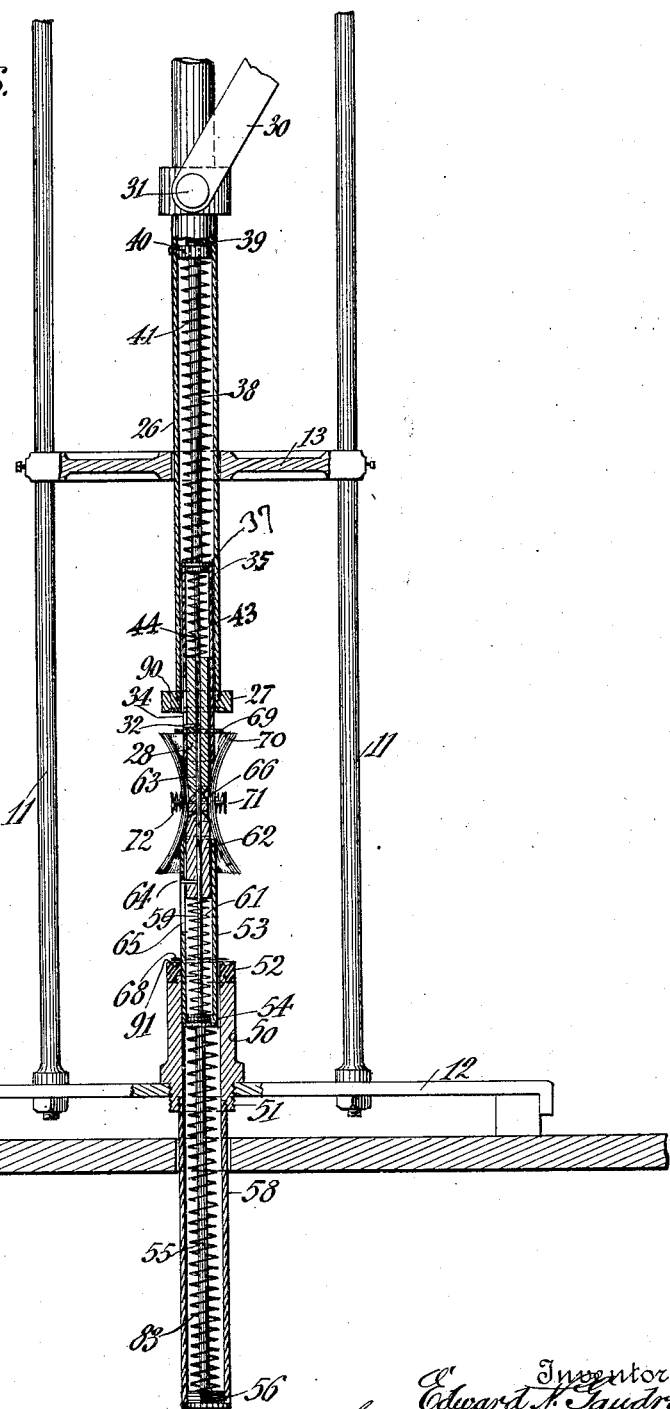
Witnesses:
John Murtagh
L. J. Murphy
Inventor
Edward N. Gaudron
By his Attorneys
Goepel Goepel

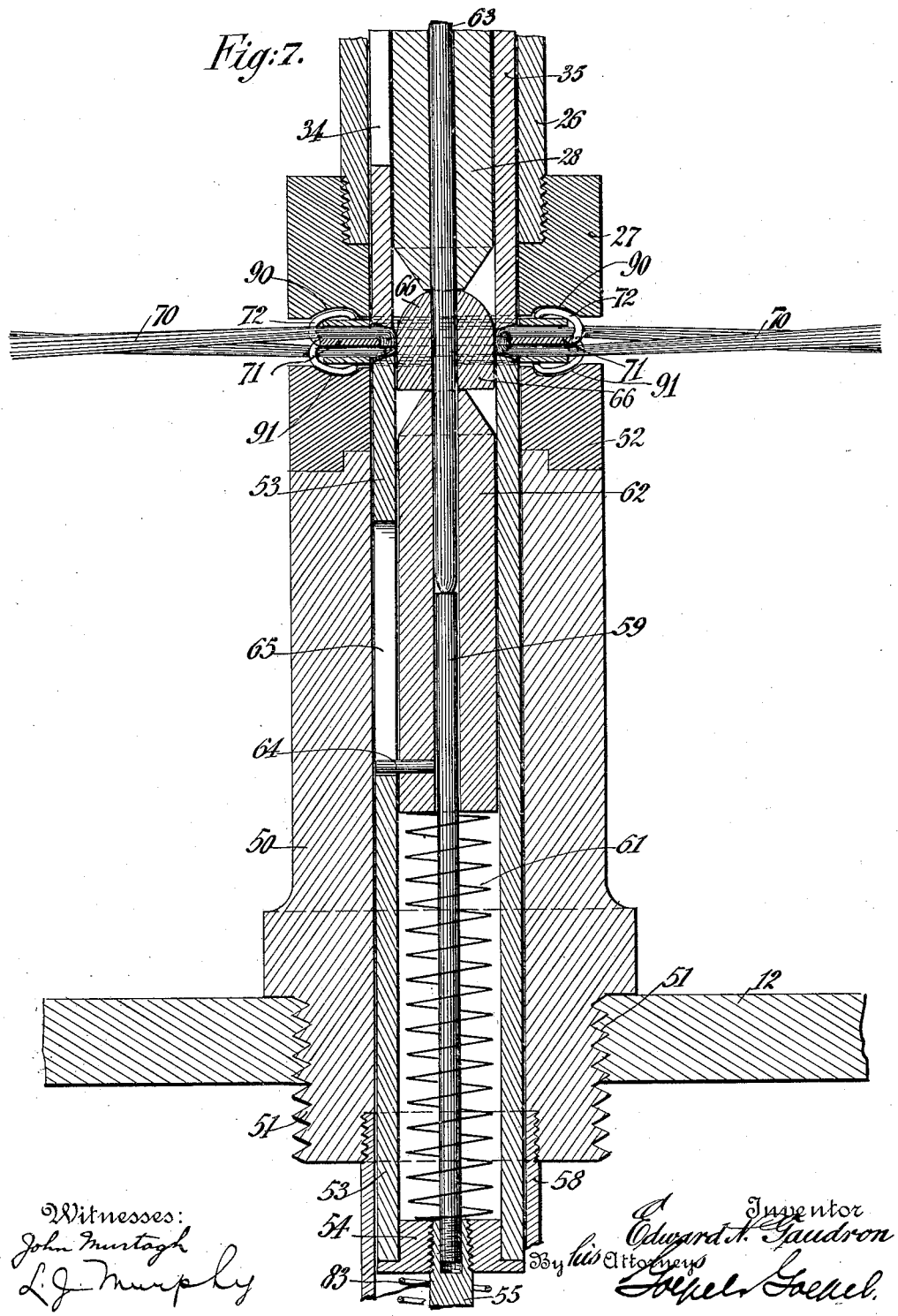

UNITED STATES PATENT OFFICE.

EDWARD N. GAUDRON, OF NEWARK, NEW JERSEY, ASSIGNOR TO WILLIAM DIXON.

MACHINE FOR MAKING BRUSHES.

1,072,326.　　　　Specification of Letters Patent.　　Patented Sept. 2, 1913.

Application filed December 11, 1911. Serial No. 664,977.

*To all whom it may concern:*

Be it known that I, EDWARD N. GAUDRON, a citizen of the United States, residing in Newark, in the county of Essex and State of New Jersey, have invented certain new and useful Improvements in Machines for Making Brushes, of which the following is a specification.

My invention relates to machines for making rotary brushes having skeleton-frames with bent-over prongs.

The object of the invention is to provide a machine of this kind for making such brushes in a quick and efficient manner and for doing away with the time-consuming machines and expensive hand-made brushes now used.

For this purpose the invention consists of a machine for making brushes which comprises opposed dies having prong-bending faces in line with the outer portion of the frame, or that portion of the same carrying the prongs, opposed yielding bunch-positioning members in advance of the dies, and opposed yielding bunch-spreading members in line with the bristles of the bunch.

The invention further contemplates that the bunch-spreading members are so formed as to serve as ring-carrying and positioning members, whereby the rings which are clamped by the prongs and form part of the brush-body are properly positioned for being so clamped.

In the accompanying drawings, Figure 1 shows a front elevation of my improved machine, before operation, Fig. 2 is a front elevation of the machine at a point in the operation, Fig. 3 is a front elevation at the completion of operation, Fig. 4 is a front view with parts in vertical section, of a part of the structure shown in Fig. 1, on a larger scale, and showing a bunch of bristles and a skeleton frame in position ready for being operated upon, Fig. 5 shows in side view a bundle of bristles as it appears in the skeleton-frame before being applied to the machine, Fig. 6 is a front view, on the same scale as Fig. 4, and with parts in vertical section, with the bristles spread from their original position and in process of being spread preparatory to clamping, and Fig. 7 is a vertical section on a still larger scale of the dies and related parts in position after the clamping operation has been completed.

Similar letters of reference indicate corresponding parts.

Referring to the drawings, the bed 10 is provided with standards 11 secured to a base-plate 12, which standards are provided with an intermediate plate 13 and a top-plate 14. One of the standards 11 supports a guide-wheel 15 over which a rope 16 passes, which rope has its lower end secured to a rod 17 connected with a foot-treadle 18 secured to the floor 19. The top-plate 14 guides a rod 20 which is secured at its upper end to a cable 21 passing over a suitably-supported guide-roller 22 and a second roller 23 and supporting a weight 24 which serves to balance the weight of the tube 26 and attached parts. The rod 20 is connected with a second rod or tube 25 which is connected with a tube 26 guided in the plate 13 and carrying at its lower end a die 27. The plate 14 supports by means of a suitable bracket bearing an elbow-lever 80 which has its free end connected with a cord 81 having secured thereto a handle 82. To the elbow lever is pivoted at 29 a link 30 which is also pivoted to the tube 26 at 31, above the plate 13. The upper end of the rope 16 is attached to the elbow lever at 33. The lever and link form a toggle-joint, which is operated by depressing the foot-treadle 18, which draws the rope 16 downwardly and thereby gives the elbow lever 80 an inward movement. The link 30 is thereby moved and presses the sleeve 26 downwardly, the parts taking the position shown in Fig. 2. A further operation is obtained by pulling the handle 82 until they take the position shown in Fig. 3.

Movable within the tube 26 is a hollow plunger-sleeve 35 which has its lower end beveled and its upper end closed by a block 37 to which is secured a plunger rod 38 having a nut 39 at its upper end beyond a transverse partition 40 secured in the tube and through which the plunger rod is free to move. Between the partition and the block 37 a compression spring 41 is interposed. This arrangement of parts permits the movement of sleeve 26 and die 27 and the sleeve 35 relatively to each other.

Within the sleeve 35 is a plunger 28 having a central bore and a conical lower end, and a pin 32 projecting laterally through a longitudinal slot 34. A compression spring 43 between the block 37 and the plunger normally depresses the plunger. A rod 44 is connected with the block 37 and enters the bore of the plunger.

The base-plate 12 supports a sleeve 50 by means of a screw-threaded portion 51 engaging the corresponding thread in the base-plate, and said sleeve supports at its upper end a die 52, which registers with and corresponds in diameter and shape substantially with the die 27. Movable within the sleeve 50 and die 52 is a plunger-sleeve 53, which is provided with a beveled upper end and which is secured at its lower end to a block 54. A rod 55 is also secured to the block 54 and passes loosely through a block 56 at the lower end of a tube 58 secured to the sleeve 50. A nut 57 is screwed on the outer end of the rod 55, and a compression spring 83 is interposed between the blocks 54 and 56. A rod 59 is also secured to the block 54 and extends upwardly within the sleeve and a compression spring 61 interposed between the block 54 and a plunger 62 in the sleeve. The plunger 62 has a central bore adapted to receive the rod 59, on which is supported in the bore a center-pin 63, which is removable from and extends upwardly beyond the upper conical end of the plunger 62, as shown in Fig. 1. The plunger has a laterally-extending pin 64 movable in a longitudinal slot 65 of the sleeve 53. The bore of the upper plunger 28 is adapted to receive the center-pin 63, when the plungers and connected parts are brought together. The strength of the various springs is so proportioned that when the parts are brought together, the plungers first equally yield, then the sleeves equally yield and retreat with the plungers, and the dies are thereby exposed for coöperation.

The operation of the machine is as follows: A ring 68, which is to form part of the completed brush, is placed around the sleeve 53, and rests upon the die 52. A similar ring is frictionally held in position on the sleeve 35 at any point below the die 27. A bundle of bristles 70 surrounded by a skeleton-frame 71 having bent-over prongs 72 as shown in Fig. 5, and having the bristles evenly divided relatively to the central axis and held in position by means of an internal mandrel 66 is placed on the pin 63 by having the pin enter the central bore of the mandrel. The parts then have the position substantially as shown in Fig. 4. Thereupon the lever 80 is operated by means of the foot-treadle 18. This causes the plunger 28, sleeve 35, die 27, and attached parts, to descend. The plunger 28 meets the mandrel 66 and presses thereon, causing both plungers 28 and 62 to slide inwardly in their sleeves. During this approach of the upper plunger to the mandrel, the conical end of the same and the beveled end of the upper sleeve have entered the upper portion of the bristle-bunch and have by their conical and beveled portions spread outwardly any inwardly-projecting stray bristles, which would otherwise be caught by the parts and eventually crushed by the dies. The plungers yield and retreat until the ends of the plunger-sleeves are flush with the same, or nearly so, and during this approach of the sleeves the annulus of bristles has been spread uniformly, and wide enough so that the rings 68 and 69 and dies 27 and 52 will not catch the outer ends of the bristles when these parts further descend. The movement of the sleeves toward each other continues until the bristles, being bent, offer sufficient resistance to prevent further advance of the same, in which position they are substantially horizontal, and are thereby divided by the upwardly and downwardly projecting prongs 72 of the skeleton-frame into separate, oppositely arranged or staggered tufts extending radially between the prongs. In this position they are held by the sleeves during the further descent of the die 27, which now takes place. Said die approaches the lower die 52, and by means of the upwardly and downwardly extending annular grooves respectively 90 and 91 of the dies 27 and 52, the prongs 72 at each side of the skeleton-frame 71 are turned back and upset upon the rings, in the position shown in Fig. 7, thereby clamping the bristles in place and all the parts of the brush together as shown. The final clamping action is effectively accomplished by a downward pull on the handle 82. After the compressing of the parts has been completed, the handle 82 is released and the levers take their original position as shown in Fig. 1, the die 27 and sleeve 35 ascending under the influence of the weight 24, while at the same time the lower plunger 62 and sleeve 53 also ascend, leaving the mandrel 66 on the pin 63 and the formed brush surrounding these parts. The mandrel and brush may be removed, and the machine is then in condition to receive another bunch of bristles for repeating the operation.

The machine described provides means whereby brushes may be made in a very quick manner and thereby saves considerable time in the process of making the same. Furthermore, the machine produces a brush that has equally distributed bristles, and is efficient in manufacture.

It is obvious that changes may be made in the construction without departing from the spirit of the invention, as set forth in the claims.

I claim:

1. A brush-making machine, comprising equal and opposite frame-bending dies, equal and opposite spring-actuated plungers, one for each die, within the same and projecting forwardly thereof toward the other plunger, and equal and opposite spring-actuated sleeves, one for each die, projecting forwardly thereof between the same and the plunger.

2. A brush-making machine, comprising equal and opposite frame-bending dies, equal and opposite spring-actuated plungers, one for each die, within the same and projecting forwardly thereof toward the other plunger, equal and opposite spring-actuated sleeves, one for each die, projecting forwardly thereof between the same and the plunger, said plungers being provided with center-bores, and a center-pin in the bore of one plunger and projecting forwardly thereof toward the other plunger.

3. A brush-making machine, comprising opposed frame-bending dies, opposed yielding bunch-positioning members in advance of said dies, and opposed yielding bunch-spreading members in advance of said dies and back of said positioning-members.

4. A brush-making machine, comprising opposed frame-bending dies in line with the outer part of the frame to be bent, yielding bunch-positioning members in advance of said dies and in line with the center of the frame, and opposed yielding bunch-spreading-members in advance of the dies and back of the positioning-members, and in line with the bristles held in said frame.

5. A brush-making machine, comprising an elongated central bunch-positioning member, a bending-die movable longitudinally thereof and normally located beyond the end of a bristle-bunch thereon, said die being wider than the end of the bristle-bunch, and a spreading-member movable in advance of the die and spreading the ends of the bristles out of the path of the die during movement of the latter into bending position.

6. A brush-making machine, comprising an inner, cylindrical, spring-actuated bunch-positioning plunger, a spring-actuated sleeve surrounding said plunger and in line with the bunch of bristles supported thereon, and an annular bending-die surrounding said sleeve, said plunger and sleeve being capable of rearward movement relatively to said die.

7. A brush-making machine, comprising an inner spring-actuated bunch-positioning plunger, a spring-actuated ring-holding and bunch-spreading sleeve surrounding said plunger and in line with the bunch of bristles supported thereon, and an annular bending-die surrounding said sleeve, said bending-die having an inwardly-inclined bending-face opposite and spaced from ring-position and extending beyond the same into prong-bending position, opposite the outer portion of the brush frame.

In testimony, that I claim the foregoing as my invention, I have signed my name in presence of two subscribing witnesses.

EDWARD N. GAUDRON.

Witnesses:
 JOHN MURTAGH,
 L. J. MURPHY.

---

Copies of this patent may be obtained for five cents each, by addressing the "Commissioner of Patents, Washington, D. C."